(12) United States Patent
Wakayanagi et al.

(10) Patent No.: US 10,365,119 B2
(45) Date of Patent: Jul. 30, 2019

(54) MAP DISPLAY CONTROL DEVICE AND METHOD FOR CONTROLLING OPERATING FEEL AROUSED BY MAP SCROLLING

(71) Applicant: MITSUBISHI ELECTRIC CORPORATION, Tokyo (JP)

(72) Inventors: Haruhiko Wakayanagi, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 56 days.

(21) Appl. No.: 15/537,834

(22) PCT Filed: Mar. 16, 2015

(86) PCT No.: PCT/JP2015/057648
§ 371 (c)(1),
(2) Date: Jun. 19, 2017

(87) PCT Pub. No.: WO2016/147287
PCT Pub. Date: Sep. 22, 2016

(65) Prior Publication Data
US 2017/0343373 A1 Nov. 30, 2017

(51) Int. Cl.
*G01C 21/36* (2006.01)
*G09B 29/00* (2006.01)
*G09B 29/10* (2006.01)

(52) U.S. Cl.
CPC .......... *G01C 21/367* (2013.01); *G01C 21/36* (2013.01); *G09B 29/00* (2013.01); *G09B 29/106* (2013.01)

(58) Field of Classification Search
CPC .. G01C 21/367; G01C 21/36; G01C 21/3694; G01C 21/3691; G01C 21/26;
(Continued)

(56) References Cited

U.S. PATENT DOCUMENTS 6,016,110 A * 1/2000 Takinami ............. G01C 21/367
340/995.16
6,067,502 A * 5/2000 Hayashida ........... G01C 21/367
340/990
(Continued)

FOREIGN PATENT DOCUMENTS

JP 2002-22470 A 1/2002
JP 2002-31539 A 1/2002
(Continued)

OTHER PUBLICATIONS

Adachi et al., Development of wide-area traffic information system, 1994, IEEE, p. 633-637 (Year: 1994).*
(Continued)

*Primary Examiner* — McDieunel Marc
(74) *Attorney, Agent, or Firm* — Birch, Stewart, Kolasch & Birch LLP

(57) ABSTRACT

In a map display apparatus, a display processor causes a display to display a map based on map information. A priority object setting unit determines a priority object having higher priority than other objects contained in the map. A scroll processor scrolls the map displayed on the display in step with a scroll operation performed by a user. In a case where the priority object is located outside the map displayed on the display, the operating feel controller adds directivity to an operating feel imparted to the scroll operation in such a manner that a scroll operation for scrolling the map toward the priority object and a scroll operation for scrolling the map in any other direction arouse different operating feels.

16 Claims, 18 Drawing Sheets

(58) Field of Classification Search
CPC .. G01C 21/3664; G09B 29/00; G09B 29/106; G06F 3/0488

See application file for complete search history.

(56) References Cited

U.S. PATENT DOCUMENTS

| | | | | |
|---|---|---|---|---|
| 7,693,657 | B2* | 4/2010 | Endo | G01C 21/3691 340/995.13 |
| 7,865,304 | B2* | 1/2011 | Gretton | G01C 21/26 340/995.13 |
| 7,865,306 | B2* | 1/2011 | Mays | G01C 21/36 340/995.19 |
| 8,321,126 | B2* | 11/2012 | Mays | G01C 21/36 340/995.19 |
| 8,825,404 | B2* | 9/2014 | Mays | G01C 21/36 340/436 |
| 9,285,880 | B2 | 3/2016 | Araki | |
| 9,495,092 | B2* | 11/2016 | Kim | G06F 3/0488 |
| 9,541,416 | B2 | 1/2017 | Kumon | |
| 10,089,380 | B2* | 10/2018 | Choi | H04L 67/22 |
| 2004/0174387 | A1 | 9/2004 | Nonaka | |
| 2007/0067104 | A1* | 3/2007 | Mays | G01C 21/36 701/437 |
| 2007/0155404 | A1* | 7/2007 | Yamane | G01C 21/3694 455/456.1 |
| 2007/0225902 | A1* | 9/2007 | Gretton | G01C 21/26 701/533 |
| 2008/0178118 | A1* | 7/2008 | Ishii | G01C 21/3664 715/810 |
| 2009/0018759 | A1* | 1/2009 | Endo | G01C 21/3691 701/117 |
| 2011/0010241 | A1* | 1/2011 | Mays | G01C 21/36 705/14.49 |
| 2013/0090850 | A1* | 4/2013 | Mays | G01C 21/36 701/533 |
| 2013/0154962 | A1* | 6/2013 | Kim | G06F 3/0488 345/173 |
| 2013/0187875 | A1* | 7/2013 | Matsuoka | G06F 3/041 345/173 |
| 2013/0257912 | A1 | 10/2013 | Ushioda | |
| 2014/0176455 | A1 | 6/2014 | Araki | |
| 2016/0109256 | A1 | 4/2016 | Kumon | |
| 2017/0363438 | A1* | 12/2017 | Wakayanagi | G01C 21/26 |

FOREIGN PATENT DOCUMENTS

| | | |
|---|---|---|
| JP | 2002-244730 A | 8/2002 |
| JP | 2004-85611 A | 3/2004 |
| JP | 2004-117266 A | 4/2004 |
| JP | 2004-219227 A | 8/2004 |
| JP | 2004-226266 A | 8/2004 |
| JP | 2005-181572 A | 7/2005 |
| JP | 2007-64844 A | 3/2007 |
| JP | 2007-212975 A | 8/2007 |
| JP | 2009-98011 A | 5/2009 |
| JP | 2010-14662 A | 1/2010 |
| JP | 2010-96737 A | 4/2010 |
| JP | 2012-141895 A | 7/2012 |
| JP | 2014-137300 A | 7/2014 |
| JP | 2014-228702 A | 12/2014 |
| WO | WO 2014/103085 A1 | 7/2014 |

OTHER PUBLICATIONS

Nishino et al., A Tangible Information Explorer Using Vibratory Touch Screen, 2012, IEEE, p. 671-677 (Year: 2012).*

Nishino et al., An Electronic Voting System for Haptic Touchscreen Interface, 2010, IEEE, p. 1164-1169 (Year: 2010).*

Yura et al., Design and implementation of the browser for the multimedia multi-user dungeon of the digital museum, 1998, IEEE, p. 1-6 (Year: 1998).*

Paneels et al., Review of Designs for Haptic Data Visualization, 2010, IEEE, p. 119-137 (Year: 2010).*

Levesque et al., Exploring the design space of programmable friction for scrolling interactions, 2012, IEEE, p. 23-30 (Year: 2012).*

Nishino et al., A Touch Screen Interface Design with Tactile Feedback, 2011, IEEE, p. 53-60 (Year: 2011).*

Kumazawa, A finger attachment to generate tactile feedback and make 3D gesture detectable by touch panel sensor, 2010, IEEE, p. 227-234 (Year: 2010).*

Akio Yamamoto, "Virtual Reality Saishin Doko Seiden Shokkaku Display Touch Gamenjo ni Texture-kan o Teiji DekiruDisplay System", Image Lab, the Sep. 2003 issue, Japan Industrial Publishing Co., Ltd., Sep. 1, 2003, vol. 14, No. 9, pp. 35-38.

Fujitsu Limited, "Fujitsu Develops Prototype Haptic Sensory Tablet" [online], retrieved on Feb. 11, 2015 from the Internet <URL:http://pr.fujitsu.com/jp/news/2014/02/24.html>.

Office Action dated Mar. 26, 2019 in corresponding Chinese Application No. 201580077594.9.

* cited by examiner

F I G. 1
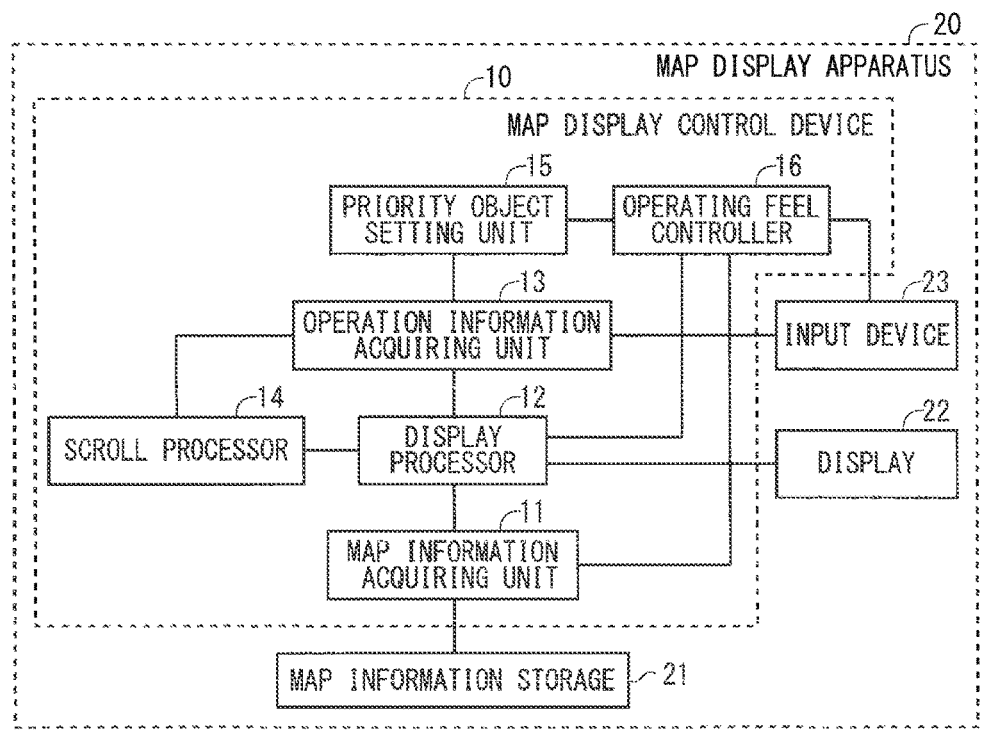
F I G. 2
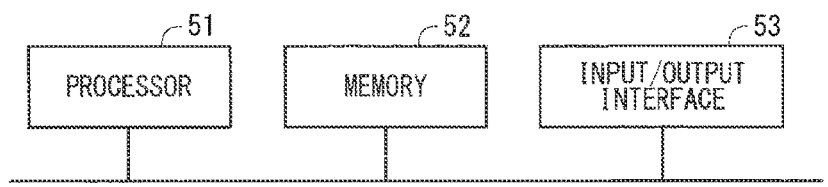

F I G . 6
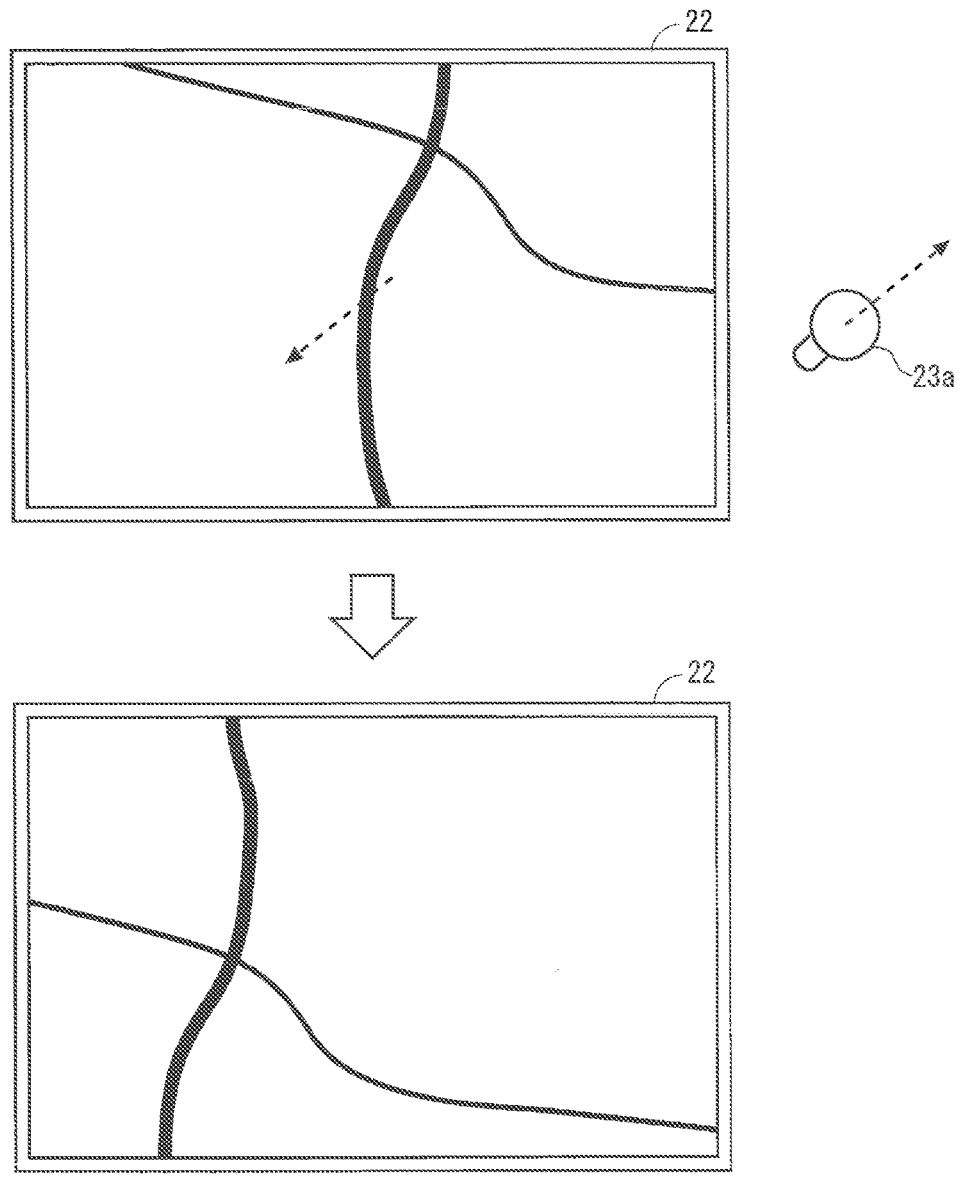

F I G . 9
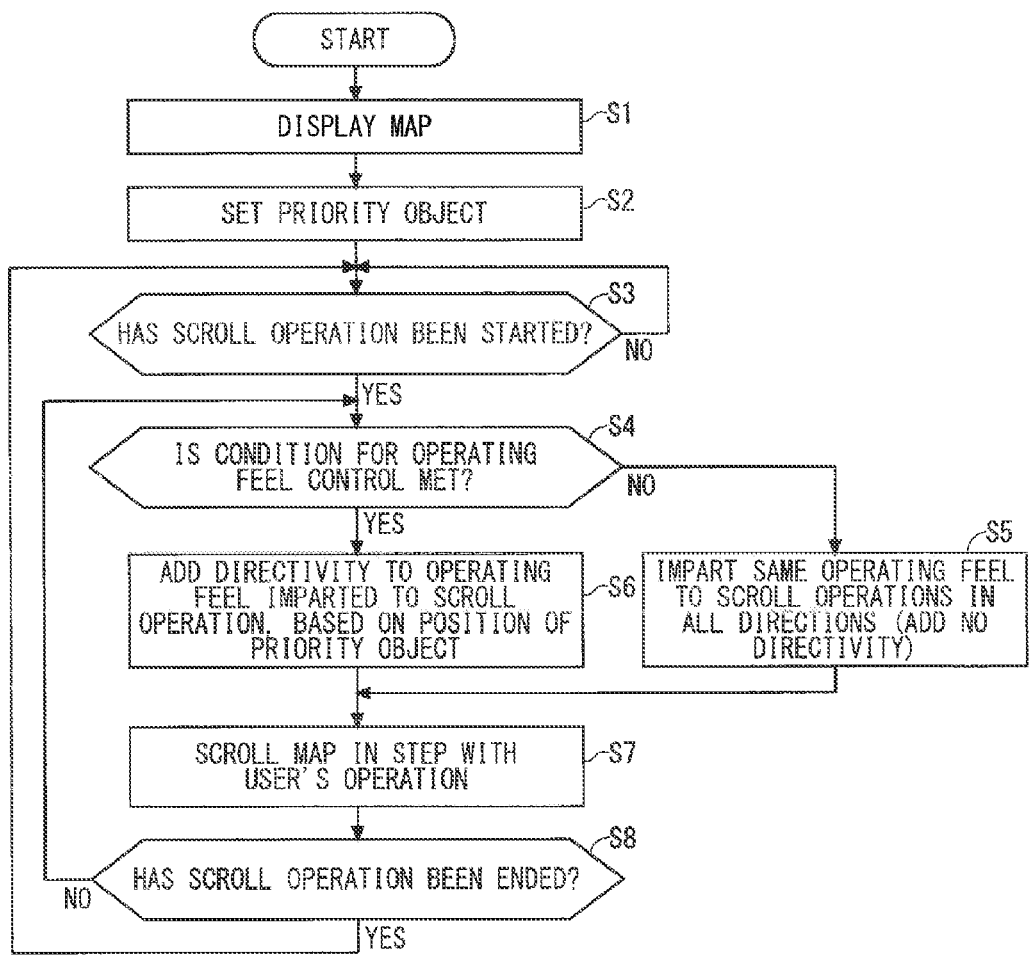

F I G . 1 7
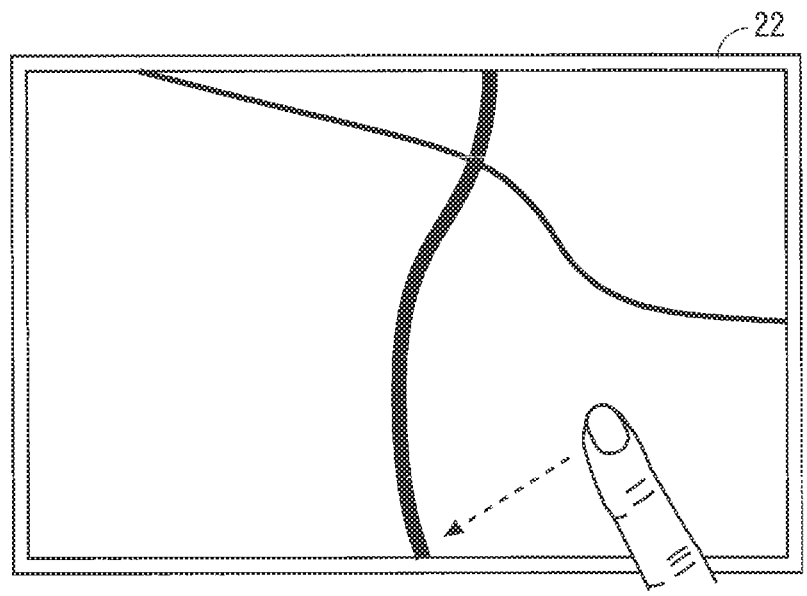
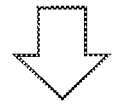
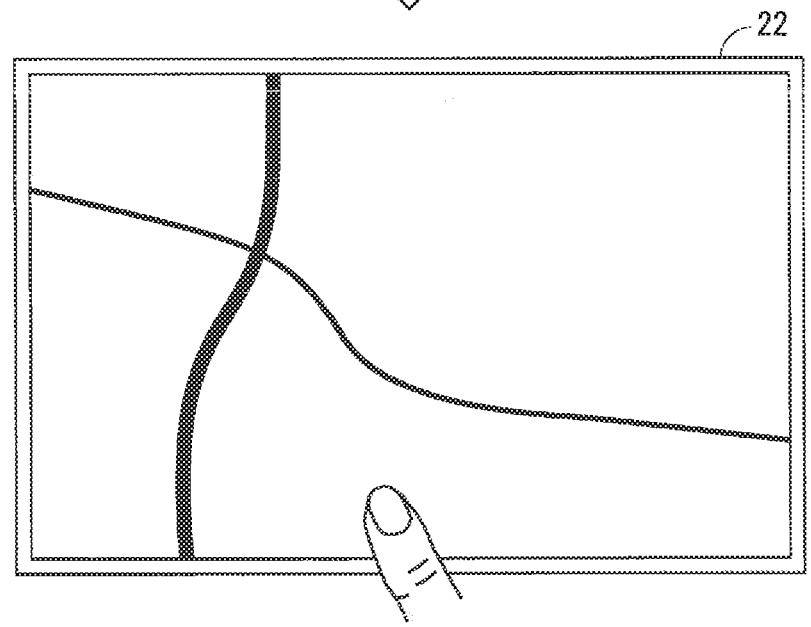

F I G. 2 8
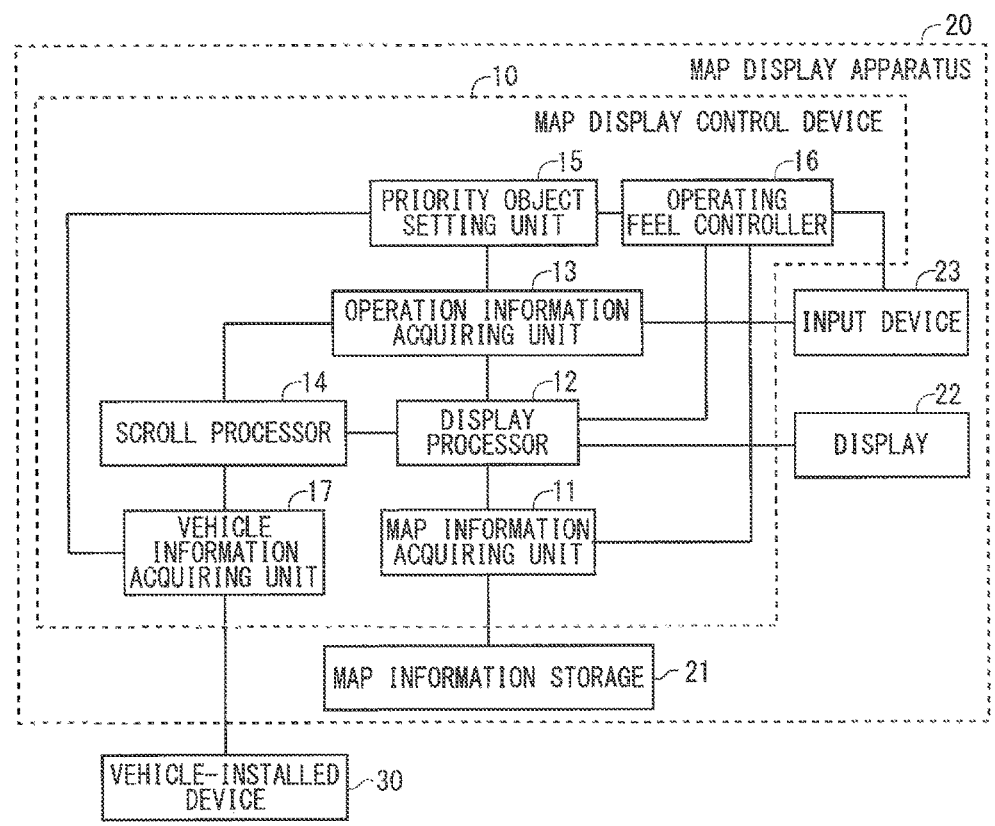

F I G. 3 1 A
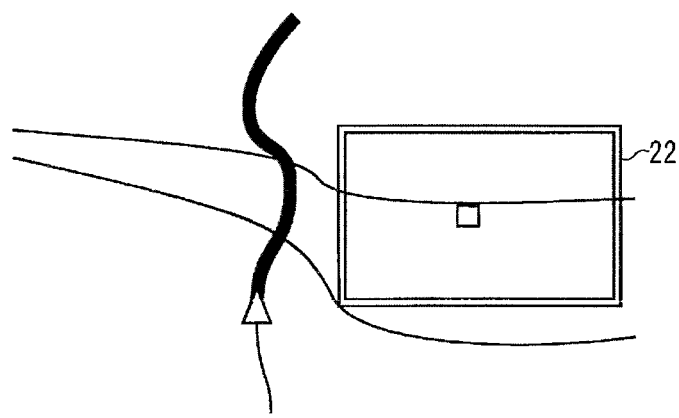
F I G. 3 1 B
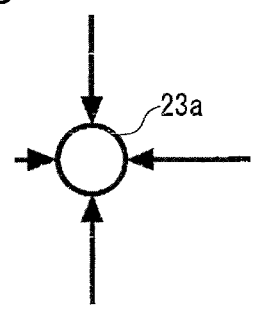

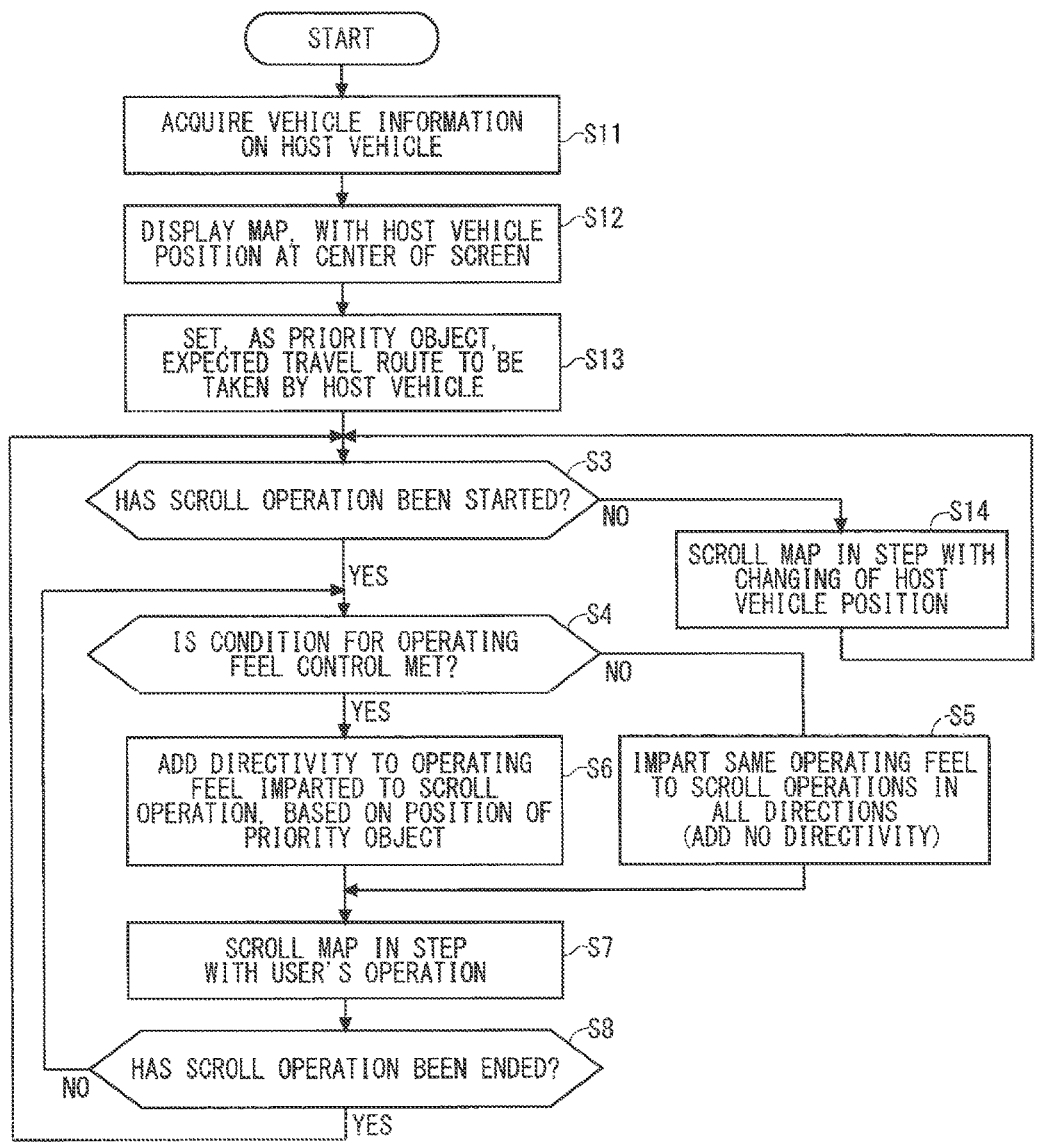

MAP DISPLAY CONTROL DEVICE AND METHOD FOR CONTROLLING OPERATING FEEL AROUSED BY MAP SCROLLING

TECHNICAL FIELD

The present invention relates to a map display control device that controls map display, and particularly relates to an operating feel control in scrolling a map on display.

BACKGROUND ART

Apparatuses that display a map on a screen of a display (map display apparatuses), such as navigation devices, have been put to practical use. Most of the map display apparatuses are capable of scrolling a map displayed on a display in response to an operation performed by the user, and various techniques concerning map scrolling have been proposed accordingly.

For example, Patent Document 1 given below discloses a navigation device capable of scrolling a map along an expected travel route (navigation route) to a destination. When a map of a specific place appears during the map scrolling, the navigation device in Patent Document 1 reduces the scrolling speed such that the information on the place is easily visible to the user. Patent Document 2 given below discloses a technique for enabling easy scrolling along an expected travel route in a manner to scroll a map faster in a direction along the expected travel route than in other directions.

Patent Document 3 given below discloses a navigation device that has the function of exerting a reaction force on an operation lever (a resistance force caused by a tilted operation lever in returning to its original position). According to Patent Document 3, a reaction force is exerted on the operation lever in response to the user's attempt to scroll a map containing an expected travel route in a direction deviating from the expected travel route. This technique facilitates scrolling along the expected travel route through the use of the operation lever.

In addition, a touch panel apparatus with a touch panel that conveys a tactile sense (texture) such as a sense of slipperiness or roughness is known (Non-Patent Document 1 given below).

PRIOR ART DOCUMENTS

Patent Documents

Patent Document 1: Japanese Patent Application Laid-Open No. 2002-022470
Patent Document 2: Japanese Patent Application Laid-Open No. 2014-137300
Patent Document 3: Japanese Patent Application Laid-Open No. 2002-31539

Non-Patent Document

Non-Patent Document 1: Fujitsu Limited, "Fujitsu Develops Prototype Haptic Sensory Tablet" [online], retrieved on Feb. 11, 2015 from the Internet <URL: http://pr.fujitsu.com/jp/news/2014/02/24.html>

SUMMARY

Problems to be Solved by the Invention

A navigation device normally displays a map of an expected travel route and therearound (a map containing at least part of an expected travel route and is hereinafter referred to as a "map containing the expected travel route"). The user sometimes fails to find a facility in the category of his/her choice on the expected travel route or looks for an alternative route, and thus, feels a need to see a map of an area away from the expected travel route (a map containing no expected travel route). In such a case, the user can scroll the map to display the map containing no expected travel route, in place of the map containing the expected travel route.

Then, the user can scroll the map again to restore the map containing the expected travel route. However, this operation presupposes that the user has a correct understanding of the positional relationship between the expected travel route and the map containing no expected travel route. However, after several iterations of map scrolling, the user may become confused about the positional relationship. The techniques of Patent Documents 1 to 3 are intended for map scrolling along the expected travel route, and thus, are not applicable to the state in which a map containing no expected travel route is displayed.

Common navigation devices have the jump function of jumping from a map of any point to a map of the current position in response to one-touch operation. Unlike the scroll function, the jump function does not provide the user with the positional relationship between the map shown prior to the jump and the map shown after the jump. Furthermore, the operation for jumping to the map of a point different from the current position is laborious.

The present invention has been made to solve the above-mentioned problems, and therefore has an object to provide a map display control device that can facilitate the user's map scroll operation for displaying a map containing a feature (object) of interest.

Means to Solve the Problem

A map display apparatus according to the present invention includes a map information acquiring unit to acquires map information, a display processor to cause a display to display a map based on the map information, an operation information acquiring unit to acquire information on an operation performed by a user with an input device, an operating feel controller to control an operating feel imparted to the user's operation by the input device, a scroll processor to scroll the map in step with a scroll operation performed by the user to scroll the map displayed on the display, and a priority object setting unit to determine a priority object having higher priority than other objects contained in the map. In a case where the priority object is located outside the map displayed on the display, the operating feel controller adds directivity to an operating feel imparted to the scroll operation in such a manner that a scroll operation for scrolling the map toward the priority object and a scroll operation for scrolling the map in any other direction arouse different operating feels.

Effects of the Invention

The present invention facilitates a map scroll operation for shifting from a map containing no priority object to a map containing a priority object. The shift from the map containing no priority object to the map containing the priority object is created by scrolling, which enables the user to recognize the positional relationship between the maps.

These and other objects, features, aspects and advantages of the present invention will become more apparent from the following detailed description of the present invention when taken in conjunction with the accompanying drawings.

BRIEF DESCRIPTION OF DRAWINGS

FIG. 1 A functional block diagram of a map display apparatus according a first embodiment.

FIG. 2 A diagram illustrating a hardware configuration of a map display control device according to the first embodiment.

FIG. 6 A diagram illustrating an example of a scroll operation in the first embodiment.

FIG. 9 A flowchart illustrating an action of the map display control device according to the first embodiment.

FIG. 17 A diagram illustrating an example scroll operation on a touch panel.

FIG. 28 A functional block diagram of the map display apparatus according to a fourth embodiment.

FIG. 31A FIG. 31B A diagram for describing the action of the map display apparatus according to the fourth embodiment.

FIG. 32 A flowchart illustrating the action of the map display control device according to the fourth embodiment.

DESCRIPTION OF EMBODIMENTS

First Embodiment

Figure 3:
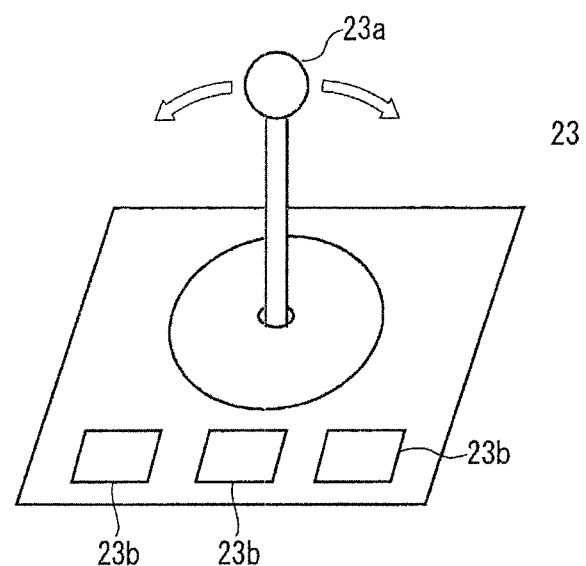
FIG. 3 A diagram illustrating a configuration of an input device in the first embodiment.

FIG. 1 is a functional block diagram of a map display apparatus 20 according to a first embodiment. The map display apparatus 20 includes a map display control device 10, a map information storage 21, a display 22, and an input device 23 that are connected to the map display control device 10. The map display apparatus 20 is specifically applicable to, for example, car navigation devices, portable navigation devices (PNDs), mobile phones, and smartphones.

The map information storage 21 is a storage medium in which map information is stored. The map information contains various features indicated on a map (including not only real objects such as roads, buildings, railways, and rivers, but also virtual objects such as boundaries and bus routes). The constituent elements of a map indicating the respective features are herein referred to as "objects". The map information storage 21 may be configured in the form of a server that distributes the map information to the map display control device 10 through a communication network such as an Internet line.

The display 22 includes a screen on which the map display control device 10 displays a map. The input device 23 is a user interface that accepts an operation and information input to the map display control device 10 by the user. The display 22 is, for example, a liquid crystal display. The input device 23 may be hardware such as an operation button, an operation lever (joy stick), a keyboard, or a mouse or may be a software key being an icon displayed on the screen. A voice recognition device to which the user inputs operation details by voice may be additionally included. In the case where the software key functioning as the input device 23 is displayed on the screen of the display 22, the display 22 and the input device 23 may constitute one touch panel into which their functions are combined.

The user can scroll the map displayed on the display 22 by operating the input device 23. The user's operation for scrolling a map is hereinafter referred to as a "scroll operation".

As illustrated in FIG. 1, the map display control device 10 includes a map information acquiring unit 11, a display processor 12, an operation information acquiring unit 13, a scroll processor 14, a priority object setting unit 15, and an operating feel controller 16.

The map information acquiring unit 11 acquires map information from the map information storage 21. The display processor 12 generates an image signal for causing the display 22 to display an image. The display processor 12 can cause the display 22 to display a map based on the map information acquired by the map information acquiring unit 11. The operation information acquiring unit 13 acquires information on an operation performed by the user with the input device 23.

The priority object setting unit 15 determines a priority object having higher priority than other objects contained in a map. Although the priority object setting unit 15 may determine which object is to be set as a priority object in any manner, the user assumedly designates a priority object by using the input device 23 in the first embodiment. The priority object setting unit 15 stores the priority object designated by the user even after the map display control device 10 finishes its action.

The priority object is not limited to a dot indicating a spot such as a building or an intersection, and may have a continuous or intermittent elongated shape indicative of, for example, a road, a railway track, an administrative boundary, a river, a coast line, or a bus route. Examples of an object deemed to be intermittent include a river and a railway track running underground in some places, an expressway impassable in some places, an archipelago, and the like.

The scroll processor 14 performs a process of scrolling a map which the display processor 12 has caused the display 22 to display. That is, when the user performs a scroll operation with the input device 23, the scroll processor 14 scrolls the map in step with the scroll operation.

The operating feel controller 16 controls a sensation (operating feel) conveyed to the user by the input device 23 while the user operates the input device 23. For example, when the user performs an operation on the input device 23, which may be an operation button, an operation lever, an icon, or the like, the operating feel controller 16 exerts a reaction force (resistance force), a vibration (haptic effects), a friction force (a tactile sense of roughness), and the like in response to the operation. As for the user's map scroll operations, in particular, scroll operations performed in different scroll directions can arouse different operating feels. The operating feel controller 16 adds directivity to the operating feel imparted to a scroll operation.

FIG. 2 is a diagram illustrating a hardware configuration of the map display control device 10. As illustrated in FIG. 2, the map display control device 10 includes at least a processor 51, a memory 52 (storage), and an input/output interface 53. The processor 51 executes programs stored in the memory 52 to implement the map information acquiring unit 11, the display processor 12, the operation information acquiring unit 13, the scroll processor 14, the priority object setting unit 15, and the operating feel controller 16 that are shown in FIG. 1.

The map information storage 21, the display 22, and the input device 23 shown in FIG. 1 are connected to the input/output interface 53 and controlled by the processor 51 executing the programs stored in the memory 52.

The map information storage 21, the display 22, and the input device 23, which are installed on the map display control device 10 as external hardware in FIG. 1, may be installed inside the map display control device 10. FIG. 2 illustrates one processor 51 and one memory 52. Alternatively, a plurality of processors 51 and a plurality of memories 52 may cooperate with one another to achieve the functions of the elements of the map display control device 10.

Figure 4:
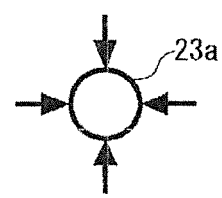
FIG. 4 A diagram illustrating an example of a reaction force exerted on an operation lever of the input device by an operating feel controller.
Figure 5:
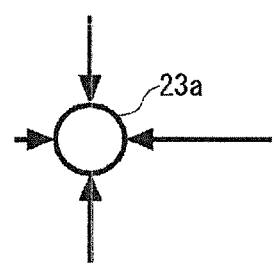
FIG. 5 A diagram illustrating an example of a reaction force exerted on the operation lever of the input device by the operating feel controller.

As illustrated in FIG. 3, the input device 23 assumedly includes an operation lever 23a and operation buttons 23b in the first embodiment. As illustrated in FIG. 4, the operation lever 23a is normally subjected to forces exerted evenly from every direction, and thus, the operation lever 23a stands on its own. The operating feel controller 16 can change the magnitude of forces exerted on the operation lever 23a in different directions, as illustrated in FIG. 5, in response to the user's operation on the operation lever 23a. In the state illustrated in FIG. 5, the user feels a strong reaction force when tilting the operation lever 23a to the right whereas the user feels a small reaction force when tilting it to the left. Thus, the user needs a smaller force in tilting the operation lever 23a to the left than in tilting it to the right.

The user can perform an operation for scrolling the map displayed on the display 22 by using the operation lever 23a. When the user tilts the operation lever 23a, the map display control device 10 accordingly scrolls the map based on the direction in which the input device 23 is tilted as illustrated in FIG. 6. In general, for the map scroll operation performed with the operation lever 23a, the direction in which the operation lever 23a is tilted (direction toward the upper right in FIG. 6) is opposite to the direction in which the map is scrolled (direction toward the lower left in FIG. 6). The user can feel as if to move on the map in the direction in which the operation lever 23a is tilted, and thus, can intuitively perform the scroll operation.

The speed of map scrolling may be adjustable according to the tilt angle of the operation lever 23a. Specifically, when the speed of scroll increases with increasing tilt angle of the operation lever 23a, the scroll operation can be performed more intuitively.

Figure 7A:
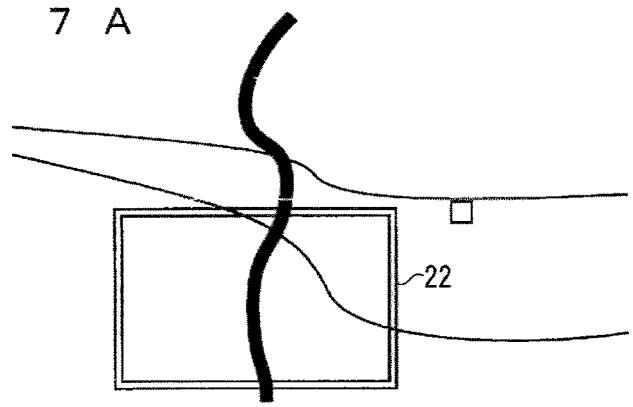
FIG. 7A FIG. 7B A diagram for describing an action of the map display apparatus according to the first embodiment.
Figure 7B:
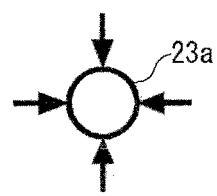
Figure 8A:
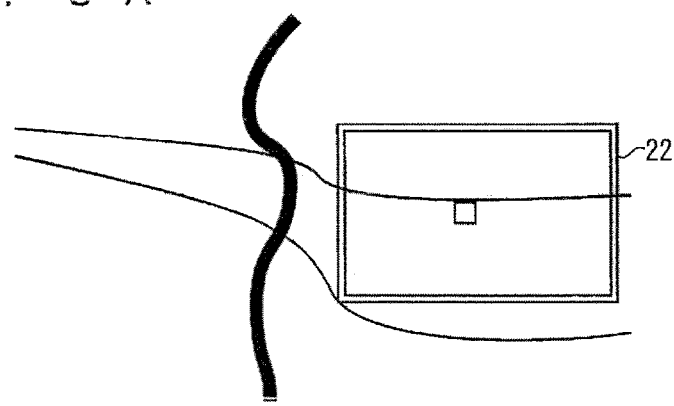
FIG. 8A FIG. 8B A diagram for describing an action of the map display apparatus according to the first embodiment.
Figure 8B:
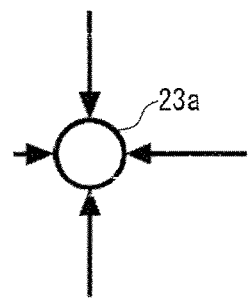

FIGS. 7A, 7B, 8A and 8B illustrate an overview of an action of the map display apparatus 20 according to the first embodiment. The action of the map display apparatus 20 according to the present invention presupposes a priority object preset in the priority object setting unit 15. Here, a specific road is assumedly set as the priority object. With reference to FIGS. 7A and 8A, the specific road being the priority object is indicated by a thick line. FIGS. 7B and 8B illustrate the magnitude of the reaction force exerted on the operation lever 23a of the input device 23 by the operating feel controller 16.

FIGS. 7A and 8A show not only the map displayed on the screen of the display 22 but also a map extending off the map on display. The map scrolling is expressed as the shift of the screen (a rectangle enclosed by a double line) of the display 22 on the map. Thus, the direction in which the display 22 shifts in FIGS. 7A and 8A is opposite to the direction in which the map is scrolled on the display 22. For example, when the map displayed on the display 22 is scrolled to the lower left as illustrated in FIG. 6, the screen of the display 22 shown in FIGS. 7A and 8A shifts to the upper right correspondingly. In other words, the direction in which the display 22 shifts in FIGS. 7A and 8A coincides with the direction in which the operation lever 23a is tilted.

Firstly, as illustrated in FIG. 7A, the priority object is assumedly displayed in the central portion of the screen of the display 22. In this case, the magnitude of reaction force to be exerted on the operation lever 23a by the operating feel controller 16 is set to be equal in all directions as illustrated in FIG. 7B. The user can tilt the operation lever 23a in any direction with a force of equal magnitude, and thus, the map scroll operation in any direction arouses the same operating feel. That is, no directivity is added to the operating feel imparted to the scroll operation.

Starting with this state, the user performs a scroll operation with the operation lever 23a, and then, the map display apparatus 20 accordingly scrolls the map based on the direction in which the operation lever 23a is tilted. Here, it is assumed that, subsequently to the map scrolling, the priority object is off the screen of the display 22 (is pushed off the screen of the display 22) as illustrated in FIG. 8A.

In this case, as illustrated in FIG. 8B, the operating feel controller 16 changes the reaction force acting on the operation lever 23a in such a manner that a scroll operation for scrolling the map toward the priority object and a scroll operation for scrolling it in any other direction arouse different operating feels. That is, directivity is added to the reaction force acting on the operation lever 23a. With reference to FIG. 8A, the priority object is located on the left outside the screen of the display 22. The operating feel controller 16 thus reduces the reaction force on the operation lever 23a tilted to the left compared with the reaction force on the operation lever 23a tilted in any other direction, so that the scroll operation for scrolling the map toward the priority object can be performed with small forces.

As described above, the directivity corresponding to the positional relationship between the map displayed on the display 22 and the priority object is added to the operating feel imparted to the operation lever 23a, and thus, the user becomes aware which direction to take to reach the priority object according to the operating feel conveyed by the operation lever 23a. Further, the scroll operation for scrolling the map toward the priority object is easy when being subjected to a smaller reaction force (or no reaction force), and thus, the map display apparatus 20 with improved operability can be realized.

FIG. 9 is a flowchart illustrating the action of the map display control device 10 according to the first embodiment. The map display control device 10 performs the action in accordance with this flowchart to enable the map display apparatus 20 to perform the action described above with reference to FIGS. 7A, 7B, 8A and 8B.

When the map display control device 10 is activated, the map information acquiring unit 11 acquires map information from the map information storage 21, and then, the display processor 12 causes the display 22 to display the map corresponding to the map information on (Step S1). The priority object setting unit 15 sets, as the priority object, an object designated by the user (Step S2). The map to be displayed in Step S1 may be any map, such as a map showing the current position and therearound and a map showing the retrieved facility and therearound.

The map display control device 10 waits for the user to perform a map scroll operation with the input device 23 (Step S3). When the user starts a scroll operation (YES in Step S3), the operating feel controller 16 judges whether to control the operating feel imparted to the input device 23 (whether to perform operating feel control) according to the position of the priority object. Such a judgment is made by determining whether a predetermined "condition for the operating feel control" is met (Step S4).

In the present embodiment, when the priority object is included in the map displayed on the display 22 (when the map containing the priority object is displayed on the display 22) as illustrated in FIG. 7A, it is judged that the condition for the operating feel control is not met (NO in Step S4). In this case, as illustrated in FIG. 7B, the operating feel controller 16 makes the setting such that the scroll operation in any direction arouses the same operating feel (Step S5). That is, no directivity is added to the scroll operation.

In contrast, when the priority object is located outside the map displayed on the display 22 as illustrated in FIG. 8A, it is judged that the condition for the operating feel control is met (YES in Step S4). In this case, as illustrated in FIG. 8B, the operating feel controller 16 adds directivity to the operating feel imparted to the scroll operation, based on the position of the priority object (Step S6). That is, setting is made in such a manner that a scroll operation for scrolling the map toward the priority object and a scroll operation for scrolling it in any other direction arouse different operating feels.

After the operating feel controller 16 makes setting on the operating feel imparted to the scroll operation, the scroll processor 14 scrolls the map in step with the user's scroll operation (Step S7).

Subsequently, the operating feel controller 16 determines whether the user's scroll operation has been ended (Step S8). If the scroll operation is in progress (NO in Step S8), Step S4 is performed again to determine whether the condition for the operating feel control is met. If the scroll operation has been ended (YES in Step S8), Step S3 is performed again to wait for another scroll operation.

Any method may be employed to determine the end of the scroll operation in Step S8. For example, in a case where a predetermined period of time has elapsed with no scroll operation since the user performed the scroll operation, it is conceivably judged that the scroll operation has been ended. Alternatively, in a case where the user performs, subsequently to the previous scroll operation, a particular operation different from the scroll operation, it may be judged that the scroll operation has been ended. For example, in a case where the operation button 23b is depressed subsequently to the scroll operation performed with the operation lever 23a, it is conceivably judged that the scroll operation has been ended.

Figure 10A:
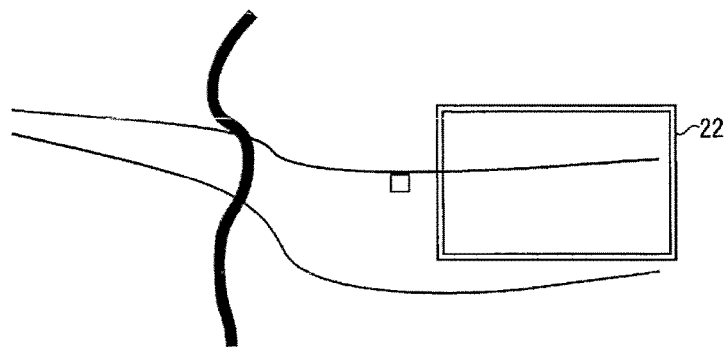
FIG. 10A FIG. 10B A diagram for describing a modification of the action of the map display apparatus according to the first embodiment.
Figure 10B:
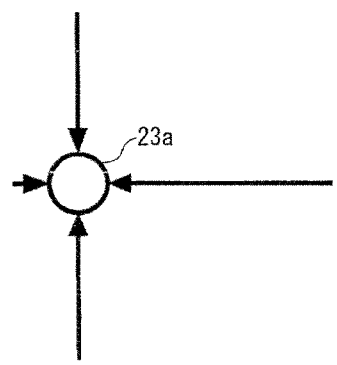
Figure 11:
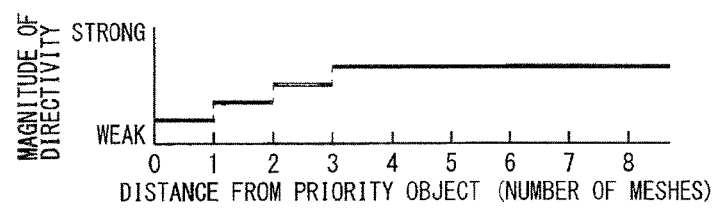
FIG. 11 A diagram for describing a modification of the action of the map display apparatus according to the first embodiment.

In Step S6, the operating feel imparted to the scroll operation or the directivity added to the operating feel may change in magnitude according to the distance between the map displayed on the display 22 and the position of the priority object. For example, when the position of the priority object is at great distance from the map displayed on the display 22 as illustrated in FIG. 10A, the reaction force on any scroll operation that is not directed toward the priority object is advisably increased as illustrated in FIG. 10B, and thus, the directivity of the reaction force exerted on the operation lever 23a (the difference between the reaction force on the scroll operation directed toward the priority object and the reaction force on a scroll operation in any other direction) is increased. FIG. 11 illustrates how the distance between the map displayed on the display 22 and the position of the priority object relates to the magnitude of the directivity added to the reaction force exerted on the scroll operation by the operating feel controller 16. The unit length on the axis of abscissas is the length of one side of each region (mesh) obtained by dividing a map in a mesh pattern.

Figure 12A:
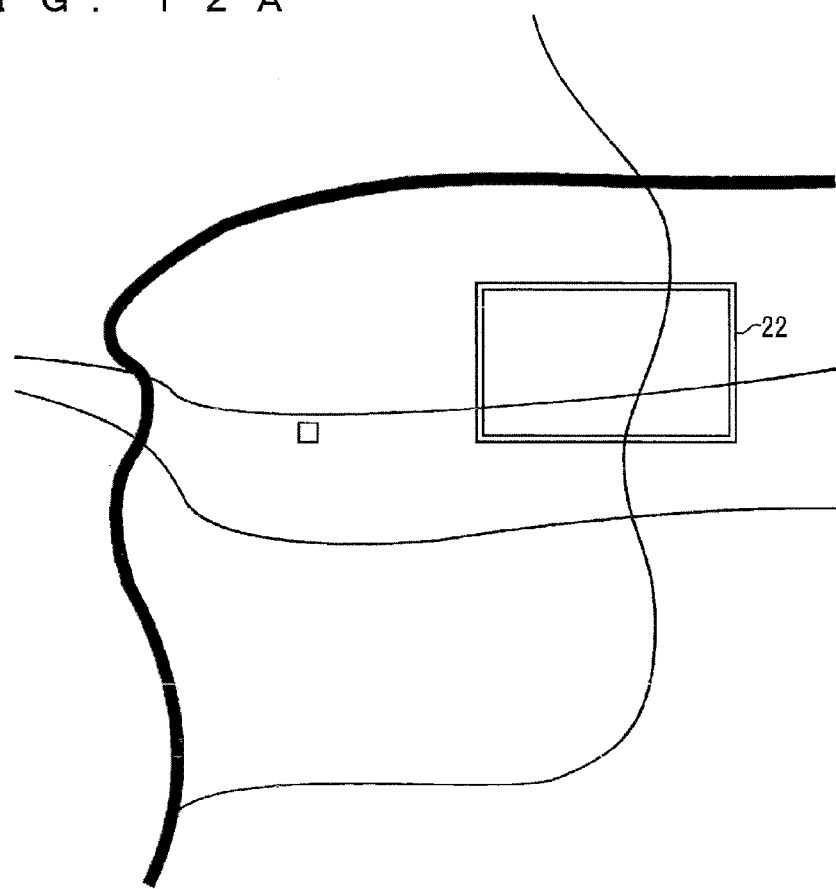
FIG. 12A FIG. 12B A diagram for describing a modification of the action of the map display apparatus according to the first embodiment.
Figure 12B:
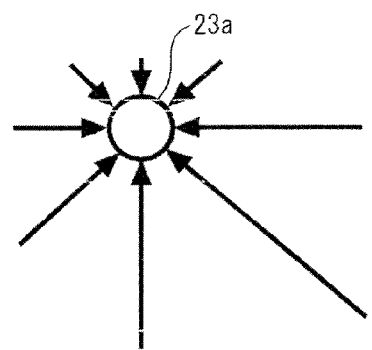

When the priority object is a dot indicating a spot, the direction toward the priority object is uniquely identified. In contrast, when the priority object has an elongated shape, the direction toward the priority object cannot be uniquely identified. To cope with this situation, operating feels of different magnitudes are advisably imparted to scroll operations in different directions correspondingly to the distance between the map displayed on the display 22 and the position of the relevant point on the priority object. For example, assume that the positional relationship between the map displayed on the display 22 and the priority object is as illustrated in FIG. 12A. Of scroll operations directed toward different points of the priority object, a scroll operation directed toward a point closer to the map on display is advisably subjected to a smaller reaction force, as illustrated in FIG. 12B.

Figure 13:
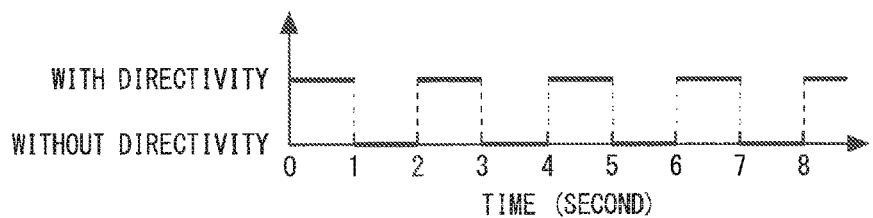
FIG. 13 A diagram for describing a modification of the action of the map display apparatus according to the first embodiment.
Figure 14:
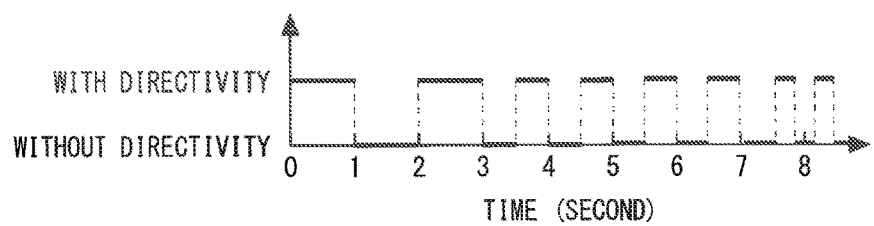
FIG. 14 A diagram for describing a modification of the action of the map display apparatus according to the first embodiment.

During the map scroll operation, the operating feel or the directivity added to the operating feel may change in magnitude in accordance with a predetermined rule. For example, switching between presence and absence of directivity may be performed at regular intervals as illustrated in FIG. 13 or at intervals shortening over time as illustrated in FIG. 14. The reaction force may decrease or increase gradually while the scroll operation is continued. In a case where the scroll speed is variable, intervals at which switching between presence and absence of directivity is performed may shorten as the scroll speed increases.

Although the two-stage switching between presence and absence of directivity in the operating feel is done in the illustrations of FIGS. 13 and 14, three or more stages (e.g., four stages including strong, moderate, weak, and none) may be assumed in the multi-stage switching.

For sequential multiple scroll operations (e.g., a scroll operation resumed after a halt), the switching between presence and absence of directivity may be done every time the scroll operation is repeatedly performed for a specific number of iterations. During a map scroll operation, the directivity may be added to the operating feel imparted to the scroll operation just as the map display range traverses a particular feature or a mesh boundary on the map. When the switching between presence and absence of directivity is done in the above-mentioned manner, the user easily becomes aware of the presence or absence of reaction force. This makes it easier to judge whether the map is scrolled in the direction toward the priority object in response to the scroll operation.

Figure 15:
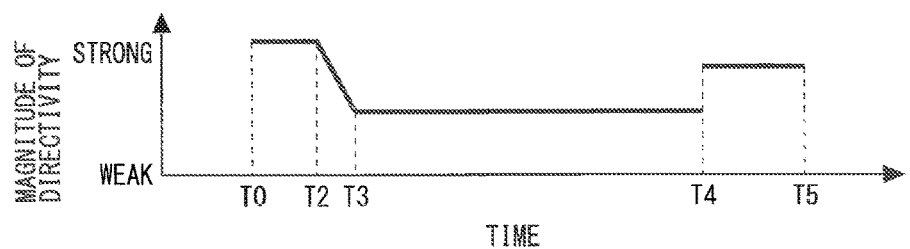
FIG. 15 A diagram for describing a modification of the action of the map display apparatus according to the first embodiment.
Figure 16:
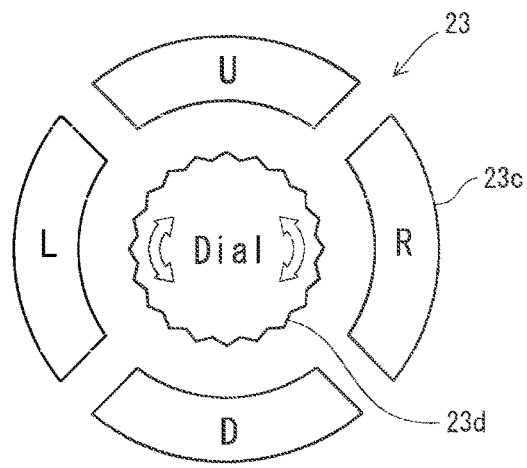
FIG. 16 A diagram illustrating a modification of the input device in the first embodiment.

The directivity may change in magnitude at the start of, in the middle of, and immediately after the scroll operation. For example, as illustrated in FIG. 15, both in the period immediately after the scroll is started (period between T0 and T1) and the period immediately after the scroll is ended (period between T4 and T5), the directivity is advisably increased to help the user identify the direction toward the priority object. It is noted that the directivity is increased immediately after the end (period between T4 and T5) in preparation for a subsequent operation. No map scrolling may be performed immediately after the start of scroll (period between T0 to T1), solely with the aim of allowing the user to identify the direction toward the priority object. In other words, the scroll operation may be started after a fixed period of time from when the scroll operation is started.

The rules (variation patterns) for setting a different condition for the operating feel control and allowing the operating feel or the directivity added to the operating feel to change in magnitude may be subject to change according to the user's manipulation of the input device 23. In particular, the pattern where the operating feel or the directivity added to the operation feel changes in magnitude may be switched in the middle of the scroll operation. For example, the pattern where the operating feel or the directivity added to the operating feel changes in magnitude can be switched according to the tilt angle of the operation lever 23a. Multiple candidates for the priority object (e.g., home, current position, and the like) may be recorded in advance to allow the user to perform switching among different priority objects when necessary. When feeling no need to add directivity to the scroll operation, the user may suspend the function.

The input device 23 may include hardware for use in the map scroll operation, besides the operation lever 23a. For example, the input device 23 may include as direction keys 23c for use in the scroll operation. In this case, while the user depresses any one of the direction keys 23c, the map display control device 10 scrolls the map in the direction corresponding to the direction key. The operating feel controller 16 controls the operating feel imparted to the individual direction key 23c by exerting a reaction force against the depression on the direction key 23c. A dial 23d located in the central part of the input device 23 is for use in, for example, zooming in or out on a map.

Second Embodiment

In a second embodiment, the following will describe an example case in which the display 22 and the input device 23 of the map display apparatus 20 constitute one touch panel.

A representative example of the scroll operation using the touch panel is a gesture operation on the screen of the display 22 on which a map is displayed (to be more precise, a touch pad as the input device 23 covering the screen). Examples of the gesture operation for enabling the scroll operation include a "drag" to slide a finger, with the finger in contact with the screen, and a "flick" to flick the screen with a finger.

FIG. 17 illustrates a scroll operation by a drag on the display 22 (touch panel). In response to the user's drag on the screen of the display 22, the map display control device 10 scrolls the map displayed on the display 22 in agreement with the direction of the drag (the direction toward the lower left in FIG. 6) and the length thereof (the distance over which the finger is shifted).

In the second embodiment, the operating feel controller 16 of the map display apparatus 20 controls the tactile sense (friction force) conveyed by the display 22, whereby the operating feel imparted to the map scroll operation is controlled.

Figure 18A:
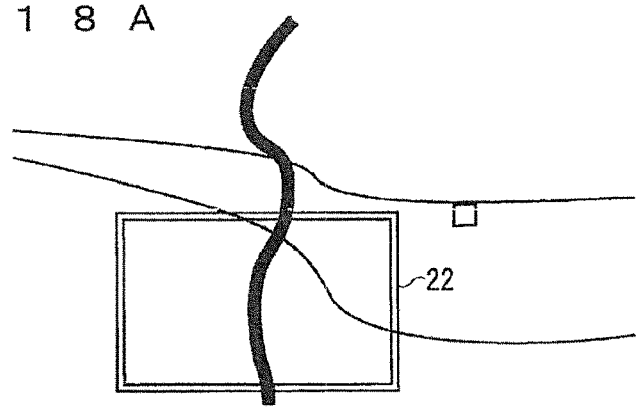
FIG. 18A FIG. 18B A diagram for describing a modification of the action of the map display apparatus according to a second embodiment.
Figure 18B:
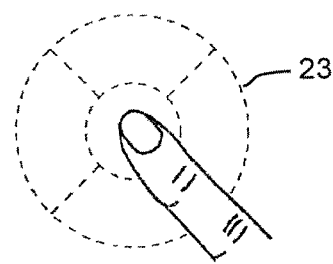
Figure 19A:
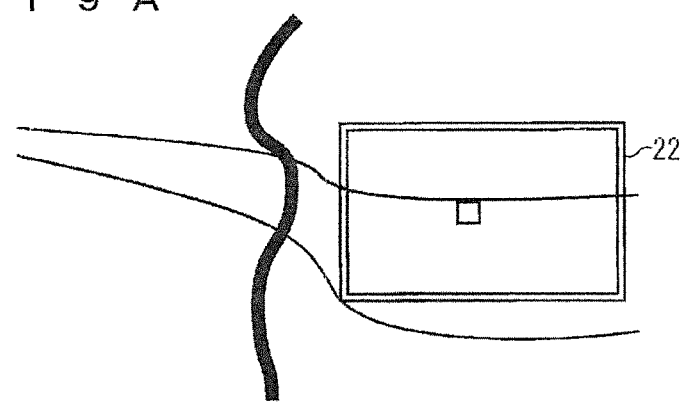
FIG. 19A FIG. 19B A diagram for describing a modification of the action of the map display apparatus according to the second embodiment.
Figure 19B:
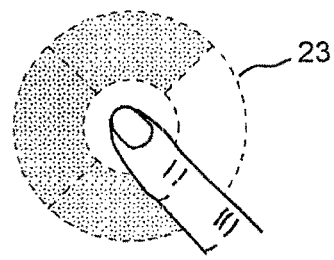

FIGS. 18A, 18B, 19A and 19B are diagrams illustrating an overview of the action of the map display apparatus 20 according to the second embodiment. As before, the specific road is indicated as the priority object by a thick line in FIGS. 18A and 19A. In FIGS. 18B and 19B, the tactile sense (texture) produced by the operating feel controller 16 is shown in each area in the vicinity of the user's touch point on the touch panel. In the area with a sand pattern, a sense of roughness can be conveyed in such a manner as to increase the friction force against the gesture operation. In the area without a pattern, a sense of slipperiness can be conveyed in such a manner as to reduce the friction force against the gesture operation.

FIGS. 18A and 19A show not only the map displayed on the touch panel (display 22) but also a map extending off the map on display. The map scrolling is expressed as the shift of the screen (a rectangle enclosed by a double line) of the touch panel on the map. Thus, in FIGS. 18A and 19A, the direction in which the touch panel shifts is opposite to the direction in which the map is scrolled on the touch panel. For example, when the map is scrolled by a drag (or a flick), the direction in which the screen of the touch panel shown in FIGS. 18A and 19A shifts is opposite to the direction of the drag. For example, when the map is scrolled by a drag toward the lower left as illustrated in FIG. 17, the screen of the touch panel shown in FIGS. 18A and 19A shifts to the upper right correspondingly.

Firstly, as illustrated in FIG. 18A, the priority object is assumedly displayed on the central part of the screen of the touch panel. In this case, a sensation that the operating feel controller 16 causes the touch panel to convey is a sense of slipperiness, which is set equally to all directions from the touch point on the touch panel as illustrated in FIG. 18B. The user can perform a drag in any direction with a force of equal magnitude, and thus, the map scroll operation in any direction arouses the same operating feel. That is, no directivity is added to the operating feel imparted to the scroll operation.

Starting with this state, the user performs a scroll operation by a drag on the touch panel, and then, the map display apparatus 20 accordingly scrolls the map based on the direction of the drag. Here, it is assumed that, subsequently to the map scrolling, the priority object is off the screen of the touch panel (is pushed off the screen of the touch panel) as illustrated in FIG. 19A.

In this case, as illustrated in FIG. 19B, the operating feel controller 16 changes the tactile sense created in the vicinity of the touch position on the touch panel in such a manner that a scroll operation for scrolling the map toward the priority object and a scroll operation for scrolling it in any other direction arouse different operating feels. With reference to FIG. 19A, the priority object is located on the left outside the screen of the touch panel. The operating feel controller 16 thus reduces the friction force on the right side compared to the friction force on other sides, so that the scroll operation for scrolling the map toward the priority object can be performed with small forces.

As described above, the operating feel controller 16 adds directivity to the operating feel conveyed by the touch panel correspondingly to the positional relationship between the map displayed on the touch panel and the priority object, and thus, the user becomes aware which direction to take to reach the priority object according to the operating feel conveyed by the touch panel. Further, the scroll operation for scrolling the map toward the priority object is easy when being subjected to a smaller friction force, and thus, the map display apparatus 20 with improved operability can be realized.

Figure 20A:
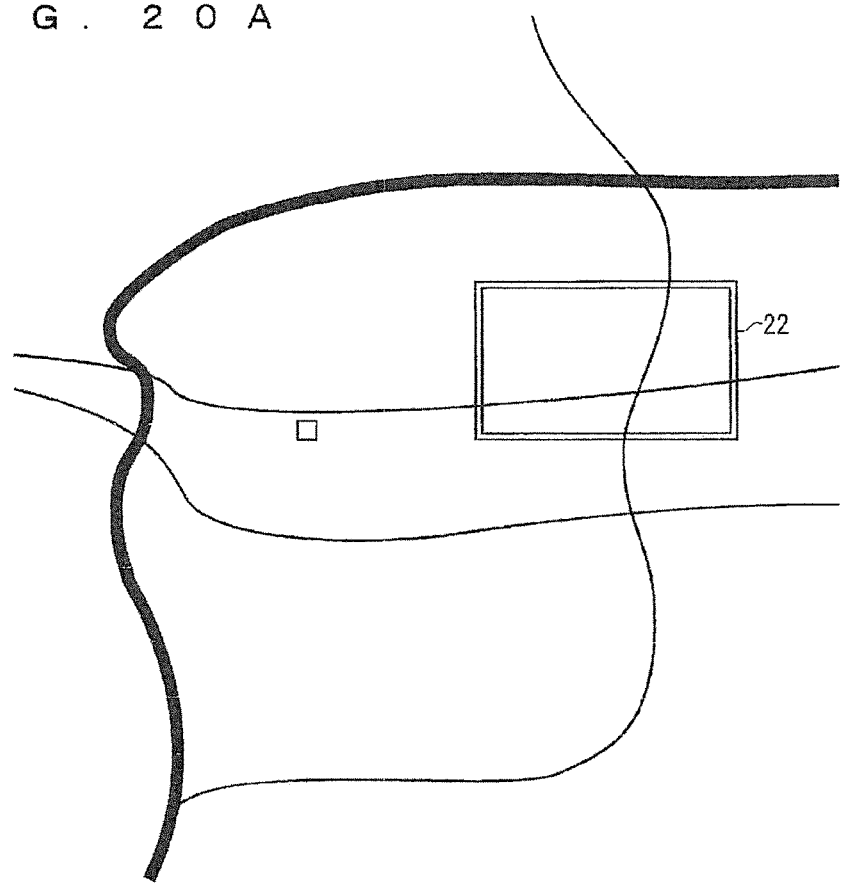
FIG. 20A FIG. 20B A diagram for describing a modification of the action of the map display apparatus according to the second embodiment.
Figure 20B:
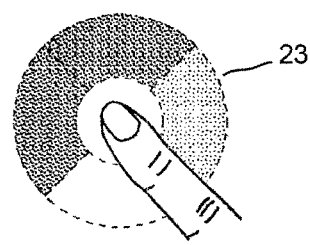

In the case where the priority object has an elongated shape, operating feels of different magnitudes are advisably imparted to different scroll operations correspondingly to the distance between the map displayed on the display 22 and the position of the relevant point on the priority object. For example, assume that the positional relationship between the map displayed on the display 22 and the priority object is as illustrated in FIG. 20A. Of scroll operations directed toward different points of the priority object, a scroll operation directed toward a point closer to the map on display is advisably subjected to a smaller friction force, as illustrated in FIG. 20B. In FIG. 20B, the denser the sand pattern is, the stronger the friction force (sense of roughness) is.

Figure 21:
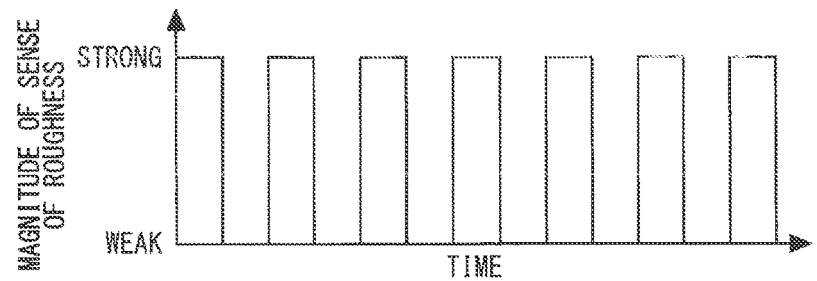
FIG. 21 A diagram for describing a modification of the action of the map display apparatus according to the second embodiment.
Figure 22:
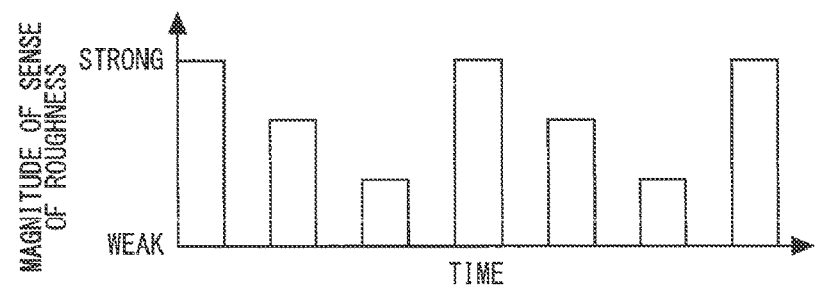
FIG. 22 A diagram for describing a modification of the action of the map display apparatus according to the second embodiment.

During the map scroll operation, the operating feel or the directivity added to the operating feel may change in magnitude in accordance with a predetermined rule. For example, switching between presence and absence of a sense of roughness may be performed at regular intervals as illustrated in FIG. 21, or a sense of roughness may change in magnitude regularly in cycles as illustrated in FIG. 22. Thus, a sense of roughness conveyed by the touch panel changes in magnitude with time, and the user can accordingly feel a sense of roughness on the panel without having to move the finger in contact with the panel.

Figure 23:
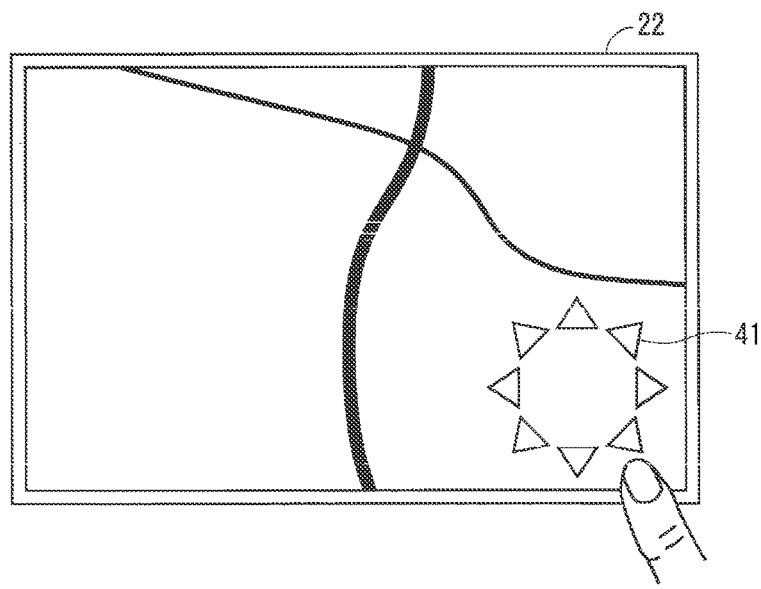
FIG. 23 A diagram for describing a modification of the action of the map display apparatus according to the second embodiment.

In the case where the display 22 and the input device 23 of the map display apparatus 20 constitute one touch panel, as illustrated in FIG. 23, an icon 41 for use in scroll operations (a scroll operation icon) may be displayed on the screen of the display 22 (touch panel). In this case, to perform a scroll operation, the user designates the direction in which the map is to be scrolled by using the scroll operation icon 41. That is, while the user touches any one of direction keys of the scroll operation icon 41, the map display control device 10 scrolls the map in the direction corresponding to the direction key. In this method, the user can scroll the map just by touching the screen without having to move the finger on the screen. Thus, the operating feel controller 16 preferably imparts an operating feel to a scroll operation in the manner shown in FIG. 21 or 22 or by vibrations.

Third Embodiment

The map display control device 10 in the first embodiment has been configured such that the operating feel controller 16 automatically performs, upon satisfaction of the condition for the operating feel control, the control (operating feel control) to add directivity to the operating feel conveyed by the input device 23 according to the position of the priority object. In a third embodiment, meanwhile, the operating feel control is allowed only by permit obtained from the user.

For example, in the case where the input device 23 has the configuration shown in FIG. 3, one of the operation buttons 23b is designated as an "operating feel control start button" in advance. Only in a case where the satisfaction of the condition for the operating feel control is determined and then the operating feel control start button of the input device 23 is depressed by the user, the map display control device 10 judges that the user's permission is given, and accordingly starts the operating feel control based on the position of the priority object.

Alternatively, whether to perform the operating feel control may be determined according to the tilt angle of the operation lever 23a. For example, even when the condition for the operating feel control is met, no operating feel control may performed when the tilt of the operation lever 23a is small, and instead, the operating feel control may be performed when the tilt is large.

Figure 24:
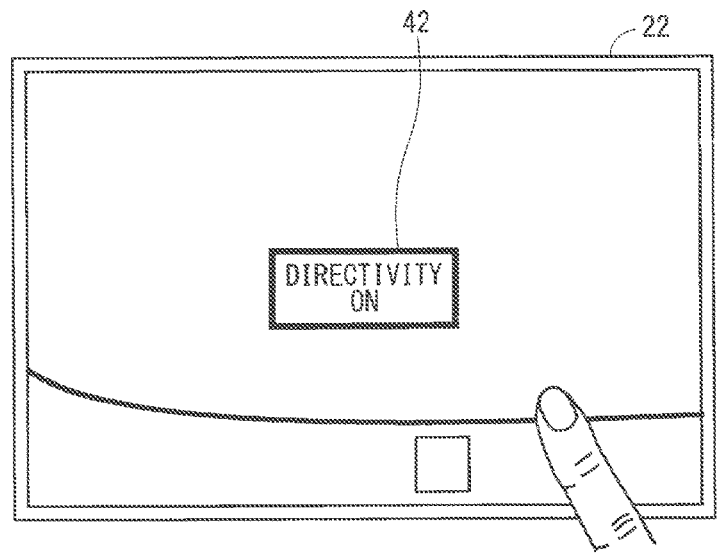
FIG. 24 A diagram illustrating an example of an operating feel control start icon in a third embodiment.

In the case where the display 22 and the input device 23 constitute one touch panel, when the satisfaction of the condition for the operating feel control is determined, the display processor 12 causes the touch panel (display 22) to display an operating feel control start icon 42 as illustrated in FIG. 24 preparatory to the execution of the operating feel control. In response to the user's operation on the operating feel control start icon 42, the operating feel controller 16 judges that the user's permission is given, and only in such a case, starts the operating feel control based on the position of the priority object.

In this embodiment, the operating feel control is started only with permission by the user. This is advantageous for the cases in which the user feels a need to keep performing a directivity-free scroll operation on the display 22.

Figure 25:
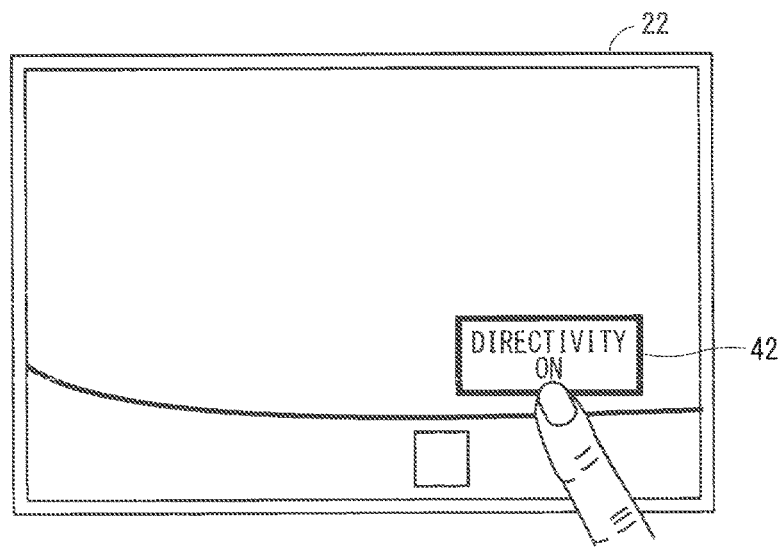
FIG. 25 A diagram illustrating an example of the operating feel control start icon in the third embodiment.

Although the operating feel control start icon 42 is displayed in the central portion of the screen of the touch panel in FIG. 24, it may be displayed in any position. For example, as illustrated in FIG. 25, the operating feel control start icon 42 may be displayed at the position corresponding to the endpoint of a scroll operation performed by using a gesture operation (e.g., the position at which the finger is moved off the screen after a drag).

Figure 26:
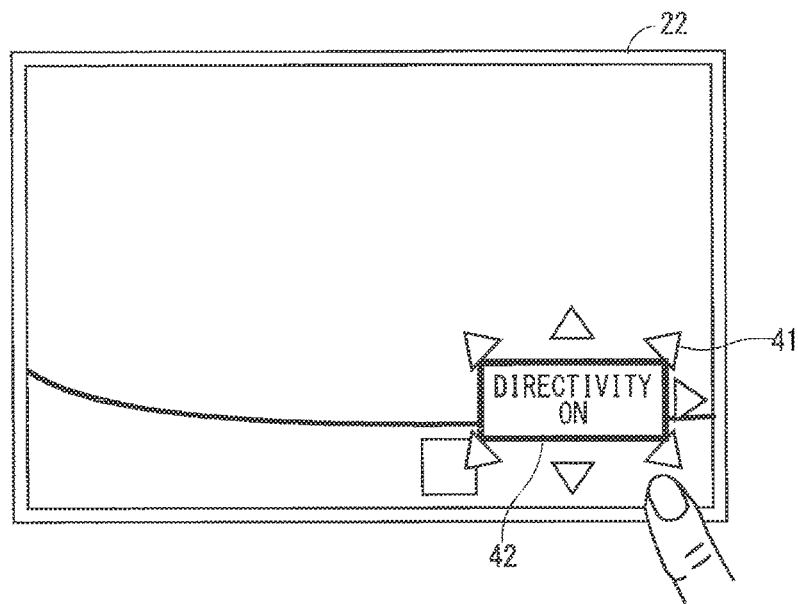
FIG. 26 A diagram illustrating an example of the operating feel control start icon in the third embodiment.
Figure 27:
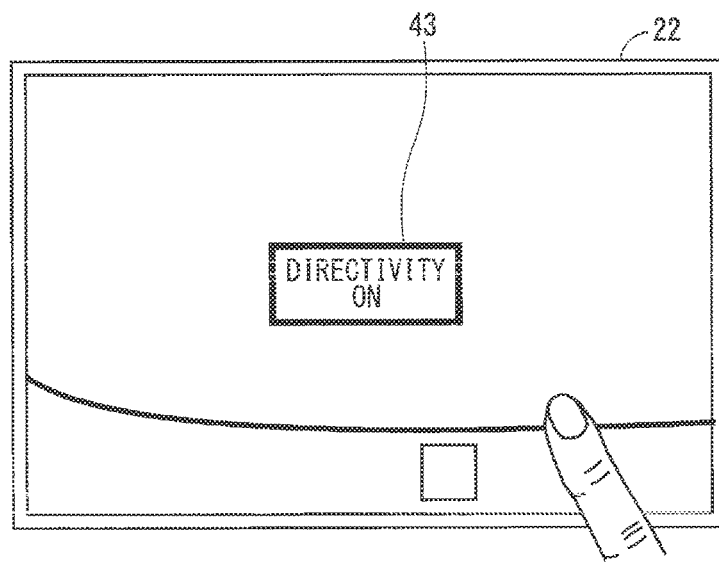
FIG. 27 A diagram illustrating an example of the operating feel control start icon in the third embodiment.

In the case where the scroll operation is performed by using the scroll operation icon 41 (software key) displayed on the touch panel as illustrated in FIG. 23, the operating feel control start icon 42 is advisably displayed near the scroll operation icon 41 as illustrated in FIG. 26.

After being started, the operating feel control based on the position of the priority object may be ended in response to the user's instruction. This produces the same effects as above.

For example, in the case the input device 23 has the configuration shown in FIG. 3, one of the operation buttons 23b is designated as an "operating feel control end button" in advance. When the operating feel control end button of the input device 23 is depressed by the user after the start of the operating feel control, the map display control device 10 ends the operating feel control.

In the case where the display 22 and the input device 23 constitute one touch panel, the display processor 12 causes the touch panel (display 22) to display an operating feel control end icon 43 once the operating feel control is started. When the user operates the operating feel control end icon 43, the operating feel controller 16 ends the operating feel control based on the position of the priority object.

Similarly to the example of the operating feel control start icon 42 in FIG. 25, the operating feel control end icon 43 may be displayed in the position corresponding to the endpoint of a scroll operation performed by using a gesture operation. In the case where the scroll operation is performed by using the scroll operation icon 41 (software key) displayed on the touch panel, similarly to the example of the operating feel control start icon 42 in FIG. 26, the operating feel control end icon 43 is advisably displayed near the scroll operation icon 41.

Fourth Embodiment

In a fourth embodiment, the following will describe an example application of the present invention to a map display apparatus to be installed on a vehicle, such as a car navigation device. FIG. 28 is a functional block diagram of the map display apparatus 20 according to the fourth embodiment. The configuration of the map display apparatus 20 in the fourth embodiment is obtained by adding a vehicle information acquiring unit 17 of the map display control device 10 to the configuration in the first embodiment (FIG. 1).

The vehicle information acquiring unit 17 acquires, from a vehicle-installed device 30 installed on a vehicle (hereinafter referred to as a "host vehicle") having the map display apparatus 20 mounted thereon, vehicle information containing both information on the current position of the host vehicle (hereinafter referred to as a "host vehicle position") and information for use in specifying an expected travel route. Here, the "expected travel route" may be a route from the host vehicle position to the destination or may be an initially expected travel route from the departure point to the destination inclusive of the route already taken by the host vehicle.

The "information for use in specifying an expected travel route" is not limited to information on the expected travel route per se, and may be information for retrieving an expected travel route such as information on the host vehicle position (or the departure point) and the destination. In this case, the vehicle information acquiring unit 17 necessitates a route search function, which can be implemented by a navigation device or the like. The vehicle information acquiring unit 17 may acquire host vehicle information such as information on the direction in which the host vehicle is headed and the travel speed, and may use the acquired information to perform a map matching process for locating the host vehicle with greater accuracy. The destination may be any place designated by the user or may be predicted by the vehicle information acquiring unit 17 based on travel history records.

Examples of the vehicle-installed device 30 include navigation devices, global navigation satellite system (GNSS) receivers such as global positioning system (GPS) receivers, and various vehicle-installed sensors (speedometers and gyro sensors). The vehicle-installed device 30 has the function of transmitting the above-mentioned vehicle information to the vehicle information acquiring unit 17.

In the map display control device 10 in the fourth embodiment, the priority object setting unit 15 automatically sets, as the priority object, the expected travel route to be taken by the host vehicle. When the map display control device 10 is activated, the display processor 12 displays a map in such a manner that the host vehicle position is shown in the specified position on the screen of the display 22. In the present embodiment, the host vehicle position is assumedly displayed at the center of the screen of the display 22. The host vehicle position may be displayed in any other position on the screen. For example, on the map with the travel direction of the host vehicle displayed as upwards ("heading-up display"), the host vehicle may be displayed slightly below the center of the screen. While the host vehicle position shifts correspondingly to the traveling host vehicle, the display processor 12 assumedly scrolls the map in such a manner that the host vehicle position is kept displayed at the same position on the screen.

Figure 29:
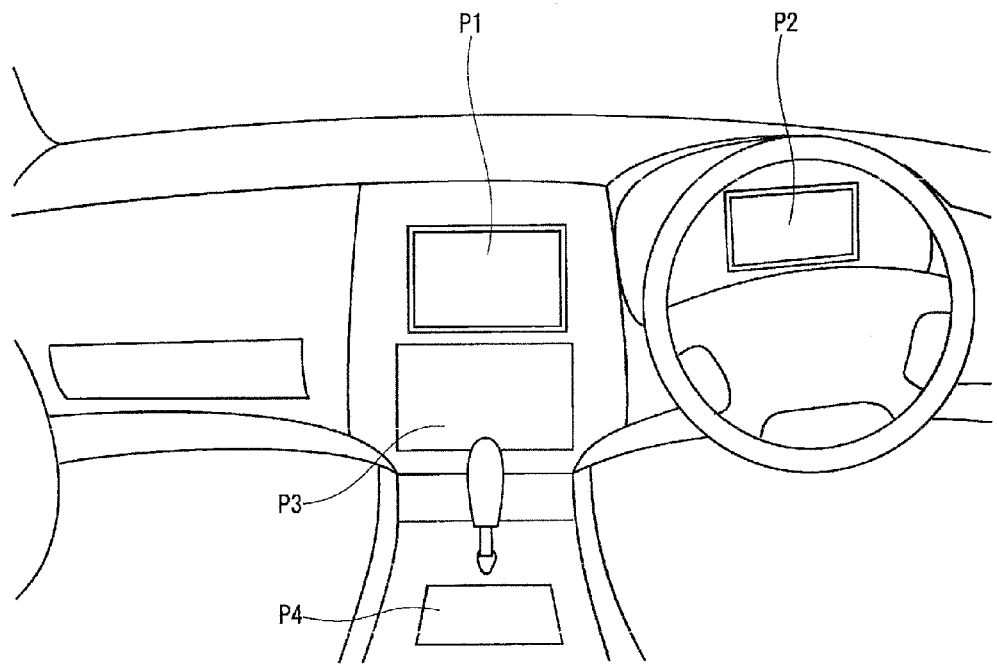
FIG. 29 A diagram for describing an example arrangement of a display and the input device of the map display apparatus according to the fourth embodiment.

With reference to FIG. 29, the following will describe an example arrangement of the display 22 and the input device 23 of the map display apparatus 20 installed on a vehicle. FIG. 29 illustrates a configuration of a typical dashboard of a vehicle.

In the case where the display 22 and the input device 23 of the map display apparatus 20 constitute one touch panel, the touch panel is preferably disposed on a center panel P1 of the dashboard of the host vehicle, with consideration given to visibility and operability of the touch panel (the operability suffers if the touch panel is disposed on an instrument panel P2).

In contrast, in the case where the display 22 and the input device 23 are separate pieces of hardware, the display 22 may be disposed on the center panel P1 or may be disposed on the instrument panel P2 easily visible to the driver. The input device 23 is advisably disposed in a part P3 below the center panel P1 of the dashboard or in a center console P4. The following description will be given based on the assumption that the input device 23 includes the operation lever 23a shown in FIG. 3 and that the user performs the map scroll operation by using the operation lever 23a as in the first embodiment.

Figure 30A:
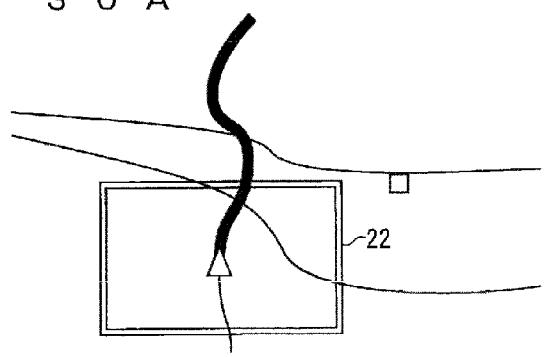
FIG. 30A FIG. 30B A diagram for describing the action of the map display apparatus according to the fourth embodiment.

FIGS. 30A, 30B, 31A and 31B illustrate an overview of the action of the map display apparatus 20 according to the fourth embodiment. As mentioned above, the priority object setting unit 15 automatically sets, as the priority object (thick line), the expected travel route to be taken by the host vehicle in the fourth embodiment. When the map display apparatus 20 is activated, the display processor 12 causes the display 22 to display a map in such a manner that the host vehicle (hollow triangle) is shown at the center of the screen as illustrated in FIG. 30A. While the host vehicle travels with no scroll operation performed by the user, the map is scrolled in such a manner that the host vehicle position is kept displayed at the same position on the screen.

The action of the map display control device 10 in response to the user's scroll operation is similar to the action described in the first embodiment with reference to FIGS. 7A, 7B, 8A and 8B.

Figure 30B:
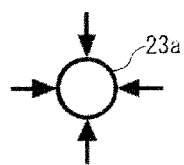

That is, in the case where the priority object is displayed in the central portion of the screen of the display 22 as illustrated in FIG. 30A, the magnitude of reaction force to be exerted on the operation lever 23a by the operating feel controller 16 is set to be equal in all directions as illustrated in FIG. 30B. When the priority object is off the screen of the display 22 (is pushed off the screen of the display 22) as illustrated in FIG. 31A, the operating feel controller 16 changes the reaction force acting on the operation lever 23a as illustrated in FIG. 31B to perform the operating feel control for adding directivity to the operating feel conveyed by the operation lever 23a.

FIG. 32 is a flowchart illustrating the action of the map display control device 10 according to the fourth embodiment. The map display control device 10 performs the action in accordance with this flowchart to enable the map display apparatus 20 to perform the action described above with reference to FIGS. 30A, 30B, 31A and 31B. The processes of Steps S3 to S8 in FIG. 32 may be similar to those described above with reference to FIG. 9.

When the map display control device 10 is activated, the vehicle information acquiring unit 17 acquires vehicle information containing information on the host vehicle position and the expected travel route from the vehicle-installed device 30 (Step S11). The display processor 12 displays a map in such a manner that the host vehicle position is shown at the center of the screen of the display 22 based on the information on the host vehicle position acquired by the vehicle information acquiring unit 17 (Step S12). The priority object setting unit 15 sets, as the priority object, the expected travel route, to be taken by the host vehicle, acquired by the vehicle information acquiring unit 17 (Step S13). Since the host vehicle position is the starting point of the expected travel route, the priority object (expected travel route) is displayed on the display 22.

The map display control device 10 waits for the user to perform a scroll operation (Step S3). While no scroll operation is performed (NO in Step S3), the display processor 12 scrolls the map in step with the changing of the host vehicle position, so that the host vehicle position is kept displayed at the center of the screen of the display 22 while the host vehicle is traveling (Step S14).

When the user starts a scroll operation (YES in Step S3), the operating feel controller 16 judges whether to control the operating feel imparted to the input device 23 (whether to perform operating feel control) according to the position of the priority object. Such a judgment is made by determining whether a predetermined "condition for the operating feel control" is met (Step S4).

When the priority object is included in the map displayed on the display 22 (when the map containing the priority object is displayed on the display 22) as illustrated in FIG. 30A, it is judged that the condition for the operating feel control is not met (NO in Step S4). In this case, as illustrated in FIG. 30B, the operating feel controller 16 makes the setting such that the scroll operation in any direction arouses the same operating feel (Step S5).

In contrast, when the priority object is located outside the map displayed on the display 22 as illustrated in FIG. 31A, it is judged that the condition for the operating feel control is met (YES in Step S4). In this case, as illustrated in FIG. 31B, the operating feel controller 16 adds directivity to the operating feel imparted to the scroll operation according to the position of the priority object (Step S6).

After the operating feel controller 16 makes setting on the operating feel imparted to the scroll operation as mentioned above, the scroll processor 14 scrolls the map in step with the user's scroll operation (Step S7).

Subsequently, the operating feel controller 16 determines whether the user's scroll operation has been ended (Step S8). If the scroll operation is in progress (NO in Step S8), Step S4 is performed again to determine whether the condition for the operating feel control is met. If the scroll operation has been ended (YES in Step S8), Step S3 is performed again to wait for another scroll operation.

The map display apparatus 20 in the fourth embodiment produces effects similar to those in the first embodiment. The map display control device 10 automatically sets, as the priority object, the expected travel route to be taken by the host vehicle, thereby saving the user from having to designate the priority object. The operating feel control start icon 42 described in the third embodiment is also applicable to the map display apparatus 20 in this embodiment.

In the above description, the processor 51 in FIG. 2 operates in accordance with the software programs stored in the memory 52 and the like to implement the constituent elements of the map display control device 10, namely, the map information acquiring unit 11, the display processor 12, the operation information acquiring unit 13, the scroll processor 14, the priority object setting unit 15, the operating feel controller 16, and the vehicle information acquiring unit 17. Alternatively, each of the above-mentioned constituent elements may be implemented by a signal processing circuit, which is hardware including electric circuits. The word " . . . unit" may be replace by " . . . processing circuit", which expresses a concept encompassing both a constituent element implemented by software and a constituent element implement by hardware.

In the present invention, the above embodiments can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE NUMERALS

10 map display control device, 11 map information acquiring unit, 12 display processor, 13 operation information acquiring unit, 14 scroll processor, 15 priority object setting unit, 16 operating feel controller, 17 vehicle information acquiring unit, 20 map display apparatus, 21 map information storage, 22 display, 23 input device, 30 vehicle-installed device, 41 scroll operation icon, 42 operating feel control start icon, 43 operating feel control end icon, 51 processor, 52 memory, 53 input/output interface.

The invention claimed is:
1. A map display control device comprising:
a processor to execute a program; and
a memory to store the program which, when executed by the processor, performs processes of,
    acquiring map information,
    causing a touch panel to display a map based on said map information, acquiring information on an operation performed on said touch panel by a user, controlling a friction force or vibration imparted by said touch panel reactively to a touch by the user while performing the operation, scrolling said map in step with a scroll operation performed by the user to scroll said map displayed on said touch panel, determining a priority object having higher priority than other objects contained in said map, and adding directivity to the imparted friction force or vibration in regard to said scroll operation in such a manner that, in a case where said priority object is located outside said map displayed on said touch panel, a scroll operation for scrolling said map toward said priority object and a scroll operation for scrolling said map in any other direction arouse different magnitudes of the imparted friction force or vibration.

2. The map display control device according to claim 1, wherein said priority object has a continuous or intermittent elongated shape.

3. The map display control device according to claim 1, wherein while the user performs said scroll operation, said processor causes the imparted friction force or vibration in regard to said scroll operation or the directivity added to the imparted friction force or vibration in regard to said scroll operation to change in magnitude in accordance with a predetermined rule.

4. The map display control device according to claim 3, wherein said processor causes the imparted friction force or vibration in regard to said scroll operation or the directivity added to the imparted friction force or vibration in regard to said scroll operation to change in magnitude according to an amount of time elapsed from a start of said scroll operation.

5. The map display control device according to claim 3, wherein said processor causes the imparted friction force or vibration in regard to said scroll operation or the directivity added to the imparted friction force or vibration in regard to said scroll operation to change in magnitude according to a distance between said map displayed on said touch panel and a position of said priority object.

6. The map display control device according to claim 3, wherein said processor causes the imparted friction force or vibration in regard to said scroll operation or the directivity added to the imparted friction force or vibration in regard to said scroll operation to change in magnitude according to a speed at which said map is scrolled.

7. The map display control device according to claim 3, wherein when a plurality of scroll operations are sequentially performed, said processor causes the imparted friction force or vibration, or the directivity added to the imparted friction force or vibration, to change in magnitude from one scroll operation to another.

8. The map display control device according to claim 1, wherein said processor starts scrolling said map after a fixed period of time from when said scroll operation is started.

9. The map display control device according to claim 1, wherein said processor adds directivity to the imparted friction force or vibration in regard to said scroll operation only with permission by the user.

10. The map display control device according to claim 1, wherein said processor causes said touch panel to display an operating feel control start icon preparatory to addition of directivity to the imparted friction force or vibration in regard to said scroll operation, and adds directivity to the imparted friction force or vibration in regard to said scroll operation only after the user operates said operating feel control start icon.

11. The map display control device according to claim 10, wherein said processor displays said operating feel control start icon at a position corresponding to an endpoint of said scroll operation on said touch panel.

12. The map display control device according to claim 1, wherein after adding directivity to the imparted friction force or vibration in regard to said scroll operation, said processor executes an instruction from the user to stop adding directivity in regard to said scroll operation.

13. A map display control device comprising:

a processor to execute a program; and a memory to store the program which, when executed by the processor, performs processes of, acquiring map information, causing a display to display a map based on said map information, acquiring information on an operation performed by a user with an input device, controlling a reaction force, vibration, or friction force imparted to said input device while the user performs said operation, scrolling said map in step with a scroll operation performed by the user to scroll said map displayed on said display, determining a priority object having higher priority than other objects contained in said map, adding directivity to the imparted reaction force, vibration, or friction force in regard to said scroll operation in such a manner that, in a case where said priority object is located outside said map displayed on said display, a scroll operation for scrolling said map toward said priority object and a scroll operation for scrolling said map in any other direction arouse different magnitudes of the imparted reaction force, vibration or friction force, causing said display to display an operating feel control end icon while said processor adds directivity to the imparted reaction force, vibration, or friction force in regard to said scroll operation, and adding no directivity to the imparted reaction force, vibration or friction force in regard to said scroll operation once the user operates said operating feel control end icon.

14. The map display control device according to claim 13, wherein said display and said input device constitute one touch panel, and said processor displays said operating feel control end icon at a position corresponding to an endpoint of said scroll operation on said touch panel.

15. The map display control device according to claim 1 installable on a vehicle, wherein said processor acquires vehicle information containing information for use in specifying an expected travel route to be taken by said vehicle, and sets, as said priority object, the expected travel route to be taken by said vehicle.

16. A method for controlling an operating feel aroused by map scrolling in a map display control device, said method comprising:
- displaying a map based on map information on a touch panel;
- determining a priority object having higher priority than other objects contained in said map;
- scrolling said map in step with a scroll operation performed on said touch panel by a user to scroll said map displayed on said touch panel; and
- adding directivity to a friction force or vibration imparted by said touch panel to a touch by the user while performing said scroll operation in such a manner that, in a case where said priority object is located outside said map displayed on said touch panel, a scroll operation for scrolling said map toward said priority object and a scroll operation for scrolling said map in any other direction arouse different magnitudes of the friction force or vibration.

* * * * *